Nov. 26, 1957
G. Y. COURTNEY
2,814,245
REGENERATING COFFEE COOKER
Filed Nov. 14, 1956
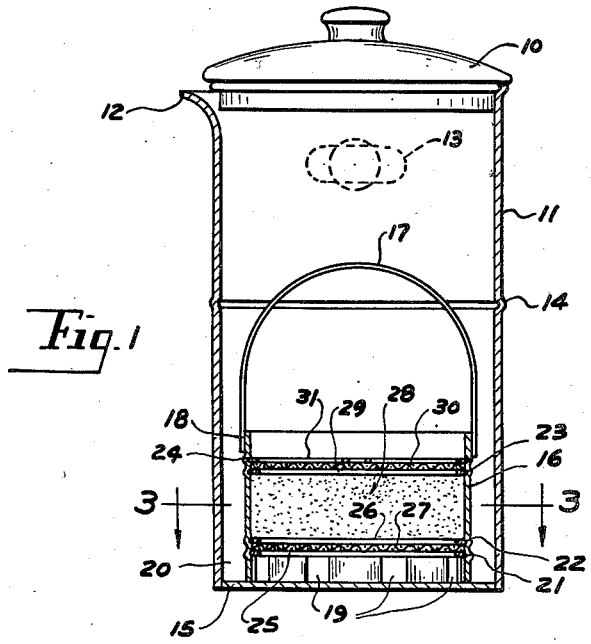
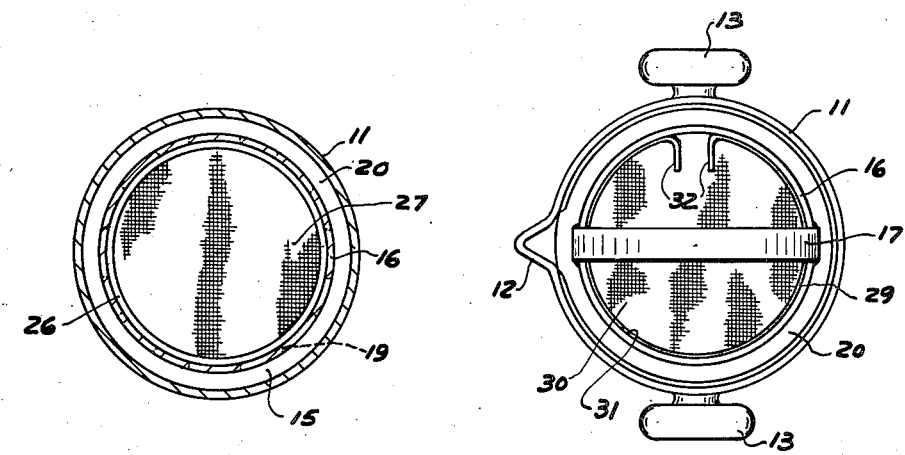
INVENTOR.
GILBERT Y. COURTNEY
BY
ATTORNEY

United States Patent Office 2,814,245
Patented Nov. 26, 1957

2,814,245
REGENERATING COFFEE COOKER
Gilbert Y. Courtney, Pontiac, Mich.

Application November 14, 1956, Serial No. 622,094

1 Claim. (Cl. 99—300)

This invention relates to the art of cooking coffee, and more particularly to a "Conservator" coffee cooker.

It is the object of the present invention to provide a novel construction of regenerating coffee pot to obtain the maximum utilization of the flavor and for minimizing the cost of producing cooked coffee as a beverage without detracting from the flavor.

It is the object of the present invention to provide within a coffee pot a novel form of flavor transfer medium to permit continuous thermal circulation of the water through the coffee grounds retained by the transfer medium to the interior of the coffee pot.

These and other objects will be seen from the following specification and claim in conjunction with the appended drawing in which:

Fig. 1 is a vertical section of the present coffee pot.
Fig. 2 is a plan view thereof.
Fig. 3 is a section taken on line 3—3 of Fig. 1.

Referring to the drawing, the present coffee pot, which is of a regenerating type, as hereafter described, consists of an upright casing 11, preferably of cylindrical form and provided with a pouring spout 12 at its top, and adjacent thereto the removable cover 10.

Opposed oval handles 13 are provided upon opposite sides of casing 11 towards its upper end to facilitate pouring.

Annular groove 14 is formed around casing 11 transversely of its length for indicating a suggested water level.

Loosely within casing 11 there is positioned the upright flavor transfer medium which consists of the metallic cylinder 16, open at both ends, and resting upon bottom wall 15.

The bail 17 is rigidly connected at its free ends as at 18 to upper portions of cylinder 16 as shown in Fig. 1. In normal use bail 17 extends above the water line designated by groove 14, to facilitate removal of cylinder 16, as desired and to avoid scalding the hands.

The exterior diameter of cylinder 16 is less than the interior diameter of casing 11 defining an upright annular space 20. Communication between said space and the interior of cylinder 16 is provided by a series of transverse notches 19 formed through the lower end of cylinder 16.

A series of longitudinally spaced annular grooves 21, 22, 23 and 24 are formed upon the interior of said cylinder as shown in Fig. 1.

The lower wire rings 25 and 26 are retained and secured within grooves 21 and 22 for permanently retaining there-between the fine wire mesh coffee ground supporting screen or disc 27.

In this connection screen disc 27 is supported above the bottom of cylinder 16 to prevent burning and for the further advantage of positioning the coffee grounds 28 above bottom wall 15, facilitating circulation between the interior of said cylinder and annular space 20 as well as the interior of casing 11 during the brewing of the coffee.

A third supporting ring, preferably of wire is provided at 29 and is positioned and retained within annular groove 23 upon the interior of cylinder 16. Ring 29 provides a support for the second wire mesh disc 30 which is loosely positioned within said cylinder.

The fourth ring 31 with inwardly directed free ends 32 is removably nested in groove 24 to retain wire mesh disc 30 with respect to a quantity of ground coffee 28 within cylinder 16 above bottom disc 27.

Operation

The first time the conservator is used it will be necessary to use two dessertspoonfuls plus one measure of medium ground coffee. Water is added to the level indicated and after boiling for the interval desired the coffee may be poured off into an urn or directly into a cup.

This initial step will not be repeated in subsequent operations.

As a second step, without removing the flavor transfer 16, hot water is poured into the pot to the depth groove 14 and let it stand for a short period such as until after the meal, and thereafter for such time as is normally employed in cleaning up the kitchen.

This will produce a weak infusion in the coffee pot. As a next step the flavor transfer 16 is removed from the pot, emptied and rinsed and filled with one measure of medium ground coffee.

The top screen 30 is replaced as is the retaining ring 31 after which the flavor transfer 16 is replaced in the pot 11, which already contains the above mentioned first stage or weak infusion. The pot holding said first stage infusion and the fresh measure of medium ground coffee is left to stand for several hours—such as until the next meal.

At that time and in order to make coffee, all that is necessary is to heat this weak coffee infusion in the pot with the fresh measure of coffee which had been standing therein to boiling after which the coffee is decanted into an urn for serving.

This completes the cycle. In other words, the pot is filled and emptied only once and the transfer flavor is filled and emptied only once during each brewing operation. The advantage of this method of use of the above described coffee conservator lies in the fact that there is always some strength left in the original coffee grounds after the coffee has been poured off.

The refilling with hot water and the standing for an hour or so produces a first stage weak infusion which otherwise would be wasted. To this weak infusion only a single measure of coffee need be added. By permitting the fresh coffee to stand for several hours in the weak infusion also produces a better utilization of the coffee grounds.

One other advantage resides in the fact that besides the economic factor, all that is necessary to make the coffee is to place it on the fire.

Having described my invention, reference should now be had to the following claim:

I claim:

In a regenerating coffee pot including a casing having a bottom wall, the flavor transfer consisting of an upright open ended cylinder removably positioned upon said bottom wall and of a diameter less than said casing defining between the walls of said casing and cylinder an upright annular space, said cylinder being transversely apertured at its lower end providing fluid connection from said space into said cylinder, a disc of finely woven wire secured within and transversely of said cylinder spaced above its lower end adapted to support a predetermined measure of ground coffee, a second disc of finely woven wire removably secured within said cylinder above said first disc confining said coffee grounds therebetween, whereby upon filling said casing with water to a predetermined level above said grounds and boiling, the infusion is adapted to flow rapidly and continuously again and again through said transverse apertures and up through the grounds and between said annular space and cylinder until a balance is reached between the flavor in the infusion and the flavor remaining in the grounds, there being a series of longitudinally spaced annular grooves formed upon the interior of said cylinder, and rings secured in said grooves retainingly engaging the lower disc upon the top and bottom thereof and supportably engaging said upper disc, and a contractable split ring assembly nested within a groove above and retainingly engaging the top disc.

References Cited in the file of this patent

UNITED STATES PATENTS

| | | |
|---|---|---|
| 133,681 | Tarlton | Dec. 3, 1872 |
| 424,807 | Munger et al. | Apr. 1, 1890 |
| 523,656 | Carpenter | July 31, 1894 |
| 645,277 | Tourville | Mar. 13, 1900 |
| 676,763 | Nelson | June 18, 1901 |
| 967,813 | Mueller | Aug. 16, 1910 |
| 1,574,021 | Bonell | Feb. 23, 1926 |
| 1,624,606 | Lane | Apr. 12, 1927 |